US011923738B2

(12) United States Patent
Leonardi et al.

(10) Patent No.: US 11,923,738 B2
(45) Date of Patent: Mar. 5, 2024

(54) ELECTRIC MACHINE FOR VEHICLE

(71) Applicant: FORD GLOBAL TECHNOLOGIES, LLC, Dearborn, MI (US)

(72) Inventors: Franco Leonardi, Dearborn Heights, MI (US); Michael W. Degner, Novi, MI (US); Prasad Dev Hanumalagutti, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 119 days.

(21) Appl. No.: 17/491,926

(22) Filed: Oct. 1, 2021

(65) Prior Publication Data
US 2023/0103957 A1    Apr. 6, 2023

(51) Int. Cl.
*H02K 3/24* (2006.01)
*B60K 6/26* (2007.10)
*H02K 5/20* (2006.01)
*H02K 9/19* (2006.01)

(52) U.S. Cl.
CPC ................. *H02K 3/24* (2013.01); *B60K 6/26* (2013.01); *H02K 5/20* (2013.01); *H02K 9/19* (2013.01); *B60Y 2200/92* (2013.01)

(58) Field of Classification Search
CPC .. H02K 1/20; H02K 5/15; H02K 5/20; H02K 9/19
USPC ......................................... 310/54, 57, 58, 59
See application file for complete search history.

(56) References Cited

U.S. PATENT DOCUMENTS

| 1,882,487 | A | * | 10/1932 | Dupont | .................... H02K 9/06 310/216.011 |
| 2,804,341 | A | | 8/1957 | Bete | |
| 4,971,184 | A | | 11/1990 | Lederman | |
| 7,566,999 | B2 | | 7/2009 | Neal | |
| 8,519,580 | B2 | * | 8/2013 | Brandl | ..................... H02K 9/16 310/58 |
| 10,020,706 | B2 | | 7/2018 | Kobes et al. | |
| 2012/0091838 | A1 | * | 4/2012 | Miyamoto | ............... H02K 5/20 310/54 |
| 2013/0285485 | A1 | | 10/2013 | Song et al. | |
| 2014/0265666 | A1 | * | 9/2014 | Shoykhet | ............... H02K 9/197 310/59 |
| 2014/0339934 | A1 | | 11/2014 | Yoshiizumi et al. | |

(Continued)

FOREIGN PATENT DOCUMENTS

| CN | 203608051 U | 5/2014 |
| DE | 19823586 A1 | 11/1999 |

(Continued)

*Primary Examiner* — Quyen P Leung
*Assistant Examiner* — Minki Chang
(74) *Attorney, Agent, or Firm* — David B Kelley; Brooks Kushman P.C.

(57) ABSTRACT

A vehicle electric machine includes a stator core having an inner diameter defining a plurality of slots, an outer diameter, and a plurality of mounting ears disposed radially outboard of the outer diameter. At least one of the mounting ears defines a cooling channel extending in an axial direction of the stator core. A radial distance between a center of the stator core and the cooling channel is greater than a radial distance between the center and the outer diameter. The machine further includes windings having portions disposed in the slots and end windings adjacent to an end face of the stator core.

20 Claims, 6 Drawing Sheets

(56) References Cited

U.S. PATENT DOCUMENTS

| | | | |
|---|---|---|---|
| 2016/0380490 A1* | 12/2016 | McClelland | H02K 7/14 |
| | | | 310/58 |
| 2017/0310189 A1 | 10/2017 | Hanumalagutti et al. | |
| 2018/0131247 A1* | 5/2018 | Froehlich | H02K 1/20 |
| 2019/0033934 A1 | 1/2019 | Myers et al. | |
| 2019/0273420 A1 | 9/2019 | Yasuda | |
| 2020/0204044 A1 | 6/2020 | Lee et al. | |
| 2022/0393526 A1 | 12/2022 | Jelinewski et al. | |

FOREIGN PATENT DOCUMENTS

| | | |
|---|---|---|
| DE | 102011076904 A1 | 12/2012 |
| DE | 102013205132 A1 | 9/2014 |
| DE | 102019216125 A1 | 4/2021 |
| EP | 220349 A1 | 5/1987 |
| EP | 0581966 A1 | 2/1994 |
| GB | 2394367 A | 4/2004 |
| JP | 2021141703 A | 9/2021 |
| RU | 2318289 C1 | 2/2008 |

* cited by examiner

ELECTRIC MACHINE FOR VEHICLE

TECHNICAL FIELD

The present disclosure relates to electric machines, for use with electric and hybrid-electric vehicles, that are capable of acting either as a motor or as a generator.

BACKGROUND

Vehicles such as battery-electric vehicles and hybrid-electric vehicles contain a traction-battery assembly to act as an energy source. The traction-battery assembly, for example, is electrically connected to an electric machine that provides torque to driven wheels. The traction-battery assembly may include components and systems to assist in managing vehicle performance and operations. It may also include high-voltage components, and an air or liquid thermal-management system to control temperature.

Electric machines typically include a stator and a rotor that cooperate to convert electrical energy into mechanical motion or vice versa. Electric machines may include thermal-management systems to cool the stator, rotor, or both.

SUMMARY

According to one embodiment, a vehicle electric machine includes a stator core having an inner diameter defining a plurality of slots, an outer diameter, and a plurality of mounting ears disposed radially outboard of the outer diameter. At least one of the mounting ears defines a cooling channel extending in an axial direction of the stator core. A radial distance between a center of the stator core and the cooling channel is greater than a radial distance between the center and the outer diameter. The machine further includes windings having portions disposed in the slots and end windings adjacent to an end face of the stator core.

According to another embodiment, a vehicle electric machine includes a housing having a closed end, an open end, and a cavity. A gasket is disposed on the closed end and defines first cooling passages extending circumferentially. A stator core has an inner diameter defining a plurality of slots, an outer diameter, and a plurality of mounting ears each disposed radially outboard of the outer diameter and each defining at least one second cooling passage extending axially. The stator core is received within the cavity with the second cooling passages in fluid communication with corresponding ones of the first cooling passages. Windings are disposed in the slots. An end cover defines third cooling passages extending circumferentially. The end cover is connected to the open end such that the second cooling passages are in fluid communication with corresponding ones of the third cooling passages.

According to yet another embodiment, a vehicle electric machine includes a stator core having an inner diameter defining a plurality of slots, an outer diameter, and a plurality of mounting ears disposed radially outboard of the outer diameter. Each of the mounting ears defines at least two cooling channels extending in an axial direction of the stator core and configured to circulate coolant in a same direction. A radial distance between a center of the stator core and the cooling channel is greater than a radial distance between the center and the outer diameter. Windings have portions disposed in the slots and end windings adjacent to an end face of the stator core. A housing has an end wall and defines a cavity that receives the stator core, wherein the end wall defines drain holes in fluid communication with the cooling channels.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made. The terms, connected, attached, etc., refer to directly or indirectly connected, attached, etc., unless otherwise indicated explicitly or by context.

Figure 1:
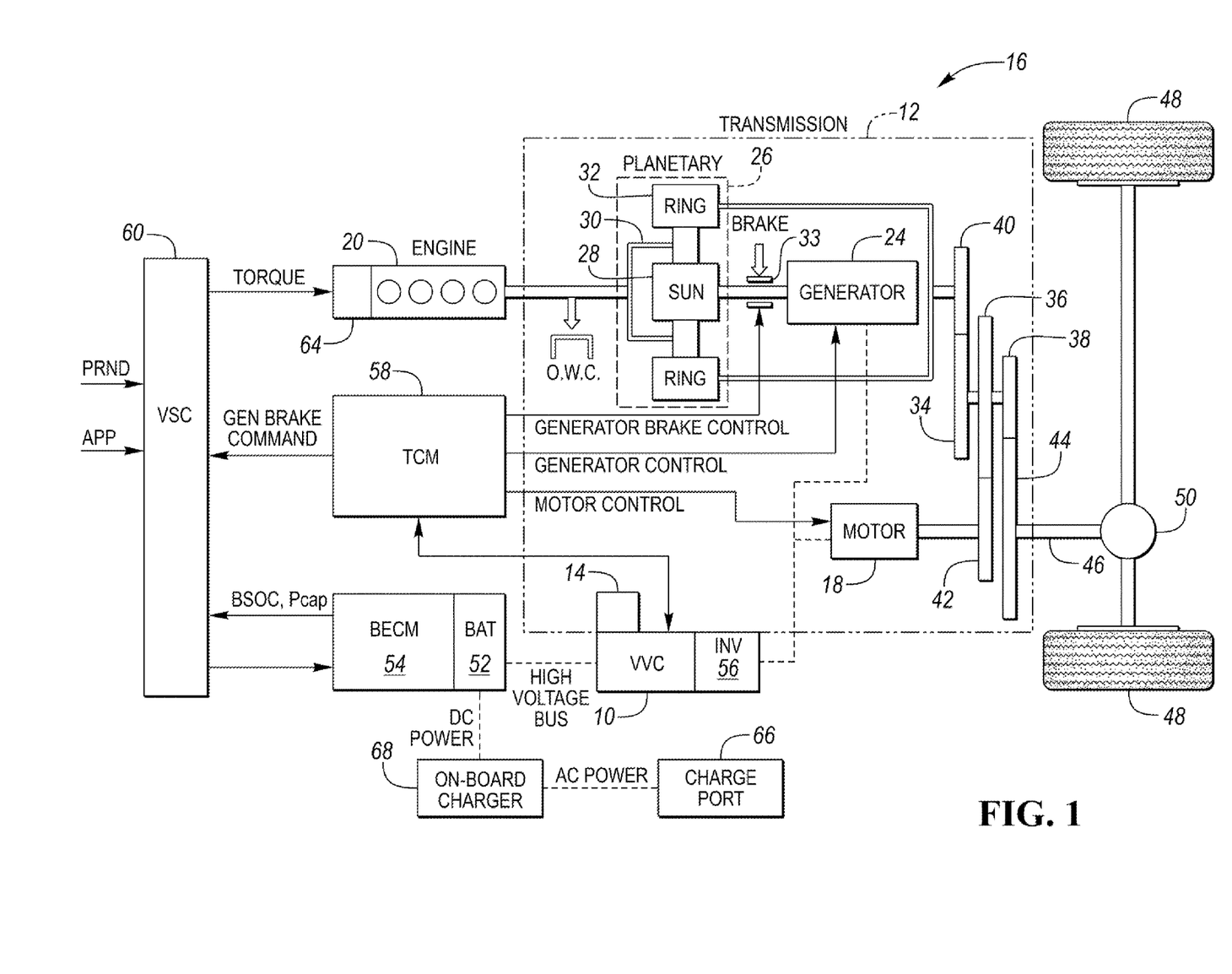
FIG. 1 is a schematic diagram of an example hybrid vehicle.

An example plugin-hybrid-electric vehicle (PHEV) is depicted in FIG. 1 and referred to generally as a vehicle 16. The vehicle 16 includes a transmission 12 and is propelled by at least one electric machine 18 with selective assistance from an internal combustion engine 20. The electric machine 18 may be an alternating current (AC) electric motor depicted as "motor" 18 in FIG. 1. The electric machine 18 receives electrical power and provides torque for vehicle propulsion. The electric machine 18 also functions as a generator for converting mechanical power into electrical power through regenerative braking.

The transmission 12 may be a power-split configuration. The transmission 12 includes the first electric machine 18 and a second electric machine 24. The second electric machine 24 may be an AC electric motor depicted as "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 12. In other embodiments, the transmission does not have a power-split configuration.

The transmission 12 may include a planetary gear unit 26, which includes a sun gear 28, a planet carrier 30, and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 12 may also include a one-way clutch (O.W.C.) and a generator brake 33. The O.W.C. is coupled to the output shaft of the engine 20 to only allow the output shaft to rotate in one direction. The O.W.C. prevents the transmission 12 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. Alternatively, the O.W.C. and the generator brake 33 may be eliminated and replaced by control strategies for the engine 20 and the second electric machine 24.

The transmission 12 may further include a countershaft having intermediate gears including a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a driveshaft 46. The driveshaft 46 is coupled to a pair of driven wheels 48 through a differential 50. The transmission output gear 44 meshes with the third gear 38 for transferring torque between the transmission 12 and the driven wheels 48.

The vehicle 16 includes an energy storage device, such as a traction battery 52 for storing electrical energy. The battery 52 is a high-voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 16 contemplate different types of energy storage devices, such as capacitors and fuel cells (not shown) that supplement or replace the battery 52. A high-voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, $P_{cap}$) that is indicative of a battery state of charge (BSOC) and a battery power capability ($P_{cap}$) to other vehicle systems and controllers.

The vehicle 16 includes a DC-DC converter or variable voltage converter (VVC) 10 and an inverter 56. The VVC 10 and the inverter 56 are electrically connected between the traction battery 52 and the first electric machine 18, and between the battery 52 and the second electric machine 24. The VVC 10 "boosts" or increases the voltage potential of the electrical power provided by the battery 52. The VVC 10 also "bucks" or decreases the voltage potential of the electrical power provided to the battery 52, according to one or more embodiments. The inverter 56 inverts the DC power supplied by the main battery 52 (through the VVC 10) to AC power for operating the electric machines 18, 24. The inverter 56 also rectifies AC power provided by the electric machines 18, 24, to DC for charging the traction battery 52. Other embodiments of the transmission 12 include multiple inverters (not shown), such as one invertor associated with each electric machine 18, 24. The VVC 10 includes an inductor assembly 14.

The transmission 12 includes a transmission control module (TCM) 58 for controlling the electric machines 18, 24, the VVC 10 and the inverter 56. The TCM 58 is configured to monitor, among other things, the position, speed, and power consumption of the electric machines 18, 24. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 receives input (PRND) that represents a current position of the transmission 12 (e.g., park, reverse, neutral or drive). The VSC 60 also receives input (APP) that represents an accelerator pedal position. The VSC 60 provides output that represents a desired wheel torque, desired engine speed, and generator brake command to the TCM 58, and contactor control to the BECM 54.

The vehicle 16 includes an engine control module (ECM) 64 for controlling the engine 20. The VSC 60 provides output (desired engine torque) to the ECM 64 that is based on a number of input signals including APP, and corresponds to a driver's request for vehicle propulsion.

If the vehicle 16 is a PHEV, the battery 52 may periodically receive AC energy from an external power supply or grid, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging. Although illustrated and described in the context of a PHEV 16, it is understood that the electric machines 18, 24 may be implemented on other types of electric vehicles, such as a hybrid-electric vehicle or a fully electric vehicle.

Figure 2:
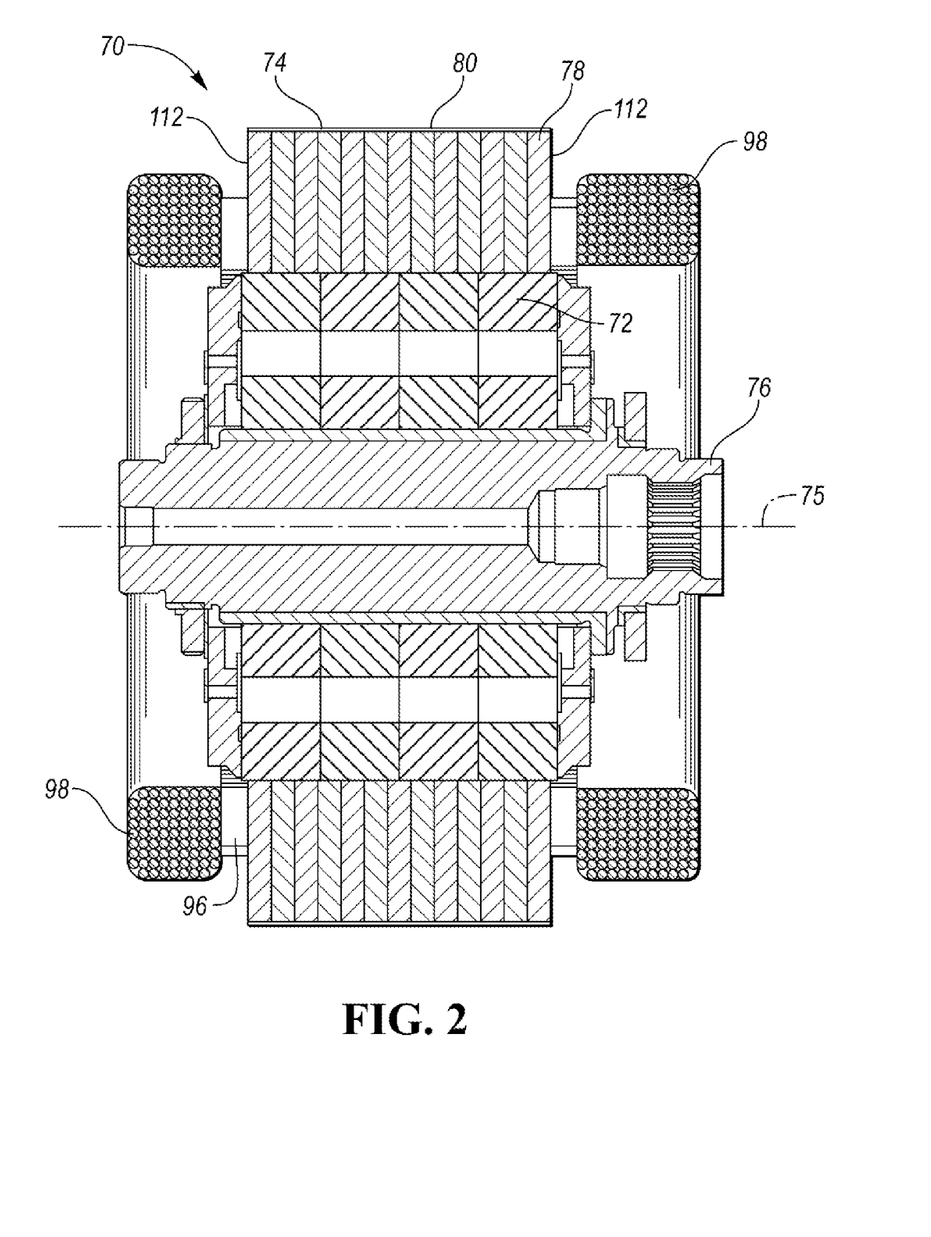
FIG. 2 is side view, in cross section, of a portion of an example electric machine.
Figure 3:
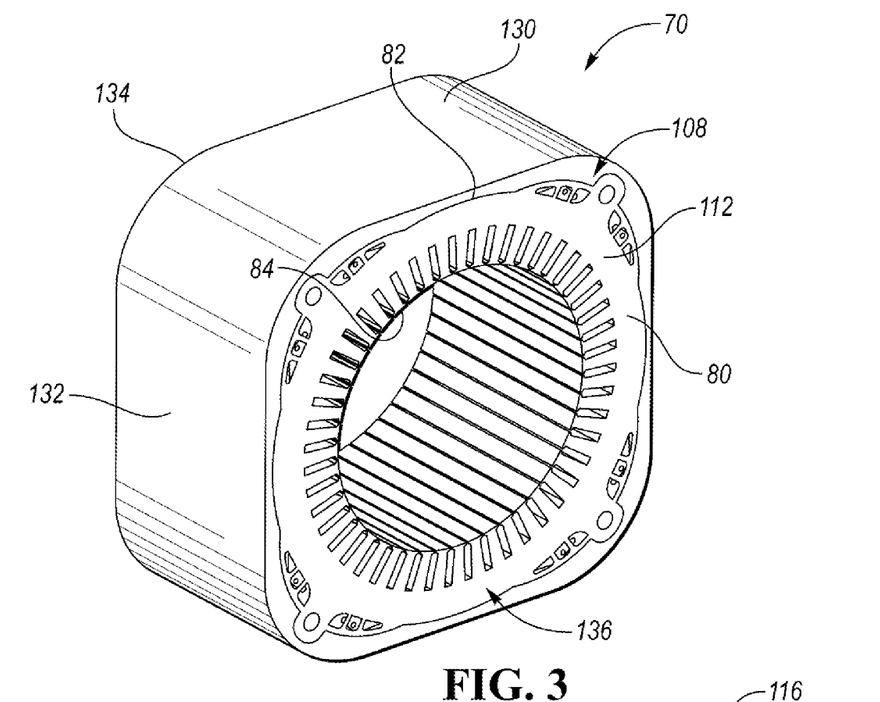
FIG. 3 is a perspective view of a stator core disposed in a housing.
Figure 4:
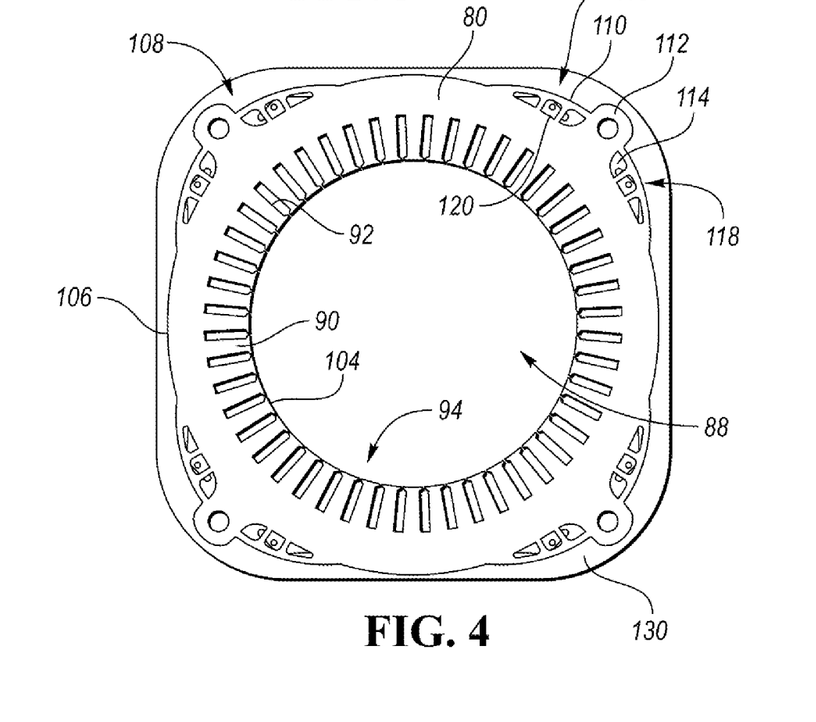
FIG. 4 is a top view of FIG. 3.

Referring to FIGS. 2, 3, and 4 an example electric machine 70 includes a stator 74 having a plurality of laminations 78. The electric machine 70 has a central axis 75. Each of the laminations 78 includes a front side and a back side. When stacked, the front and back sides are disposed against adjacent front and back sides to form a stator core 80. Each of the laminations 78 may define a hollow center.

Each lamination 78 includes an inner diameter 84 defining a plurality of teeth 90 extending radially inward toward the inner diameter 84. Adjacent teeth 90 cooperate to define slots 92. The teeth 90 and the slots 92 of each lamination 78 are aligned with adjacent laminations to define stator slots 94 extending axially through the stator core 80 between the opposing end faces 112. The end faces 112 define the opposing ends of the core 80 and are formed by the first and last laminations of the stator core 80. A plurality of windings (also known as coils, wires, or conductors) 96 are wrapped around the stator core 80 and are disposed within the stator slots 94. The windings 96 may be disposed in an insulating material (not shown). Portions of the windings 96 generally extend in an axial direction along the stator slots 94. At the end faces 112 of the stator core, the windings bend to extend circumferentially around the end faces 112 of the stator core 80 forming the end windings 98. While shown as having distributed windings, the windings could also be of the concentrated or hairpin type.

A rotor 72 is disposed within the cavity 88 of the stator 74. The rotor 72 is fixed to a shaft 76 that is operably connected to the gearbox. When current is supplied to the stator 74, a magnetic field is created causing the rotor 72 to spin within the stator 74 generating a torque that is supplied to the gear box via one or more shafts or gears, or the like.

The core 80 includes an inner diameter 104 and an outer diameter 106 that are each concentric with a center of the core 80. Mounting ears 108 are disposed radially outboard of the outer diameter 106. In the illustrated embodiment, the stator core 80 includes four mounting ears 108. The addition of the mounting ears 108 to the outer diameter 106 creates a generally rectangular cross section. Each of the mounting ears 108 may include an arcuate outer surface 110 and a tab 112. One or more cooling channels 114 are defined in at least one of the mounting ears 108. The cooling channel(s) 114 extends in the axial direction of the stator core and may extend completely through the core 80. In the illustrated embodiment, each of the mounting ears 108 includes a plurality of cooling channels 114. As shown, the cooling channels of each ear 108 are grouped into first and second sets 116 and 118. (Used herein, a "set" includes one or more cooling channels.) The flow direction of the cooling channels of the first set 116 may be opposite of the flow direction of the cooling channels of the second set 118 in at least some of the mounting ears 108. A radial distance between the center of the core 80 and an inner-most point, e.g., 120, of cooling channels 114 is greater than the radial distance between the center of the core and the outer diameter 106. This places the coolant channels 114 out of the yoke portion (region between the outer diameter and the base of the teeth) of the stator core 80. By moving the cooling channels 114 radially outboard of the outer diameter, the flux path of the electric machine is less affected than in designs having cooling channels extending through the yoke portion. Each of the laminations 78 include individual features that cooperate to form the mounting ears and their associated features described above.

Figure 7:
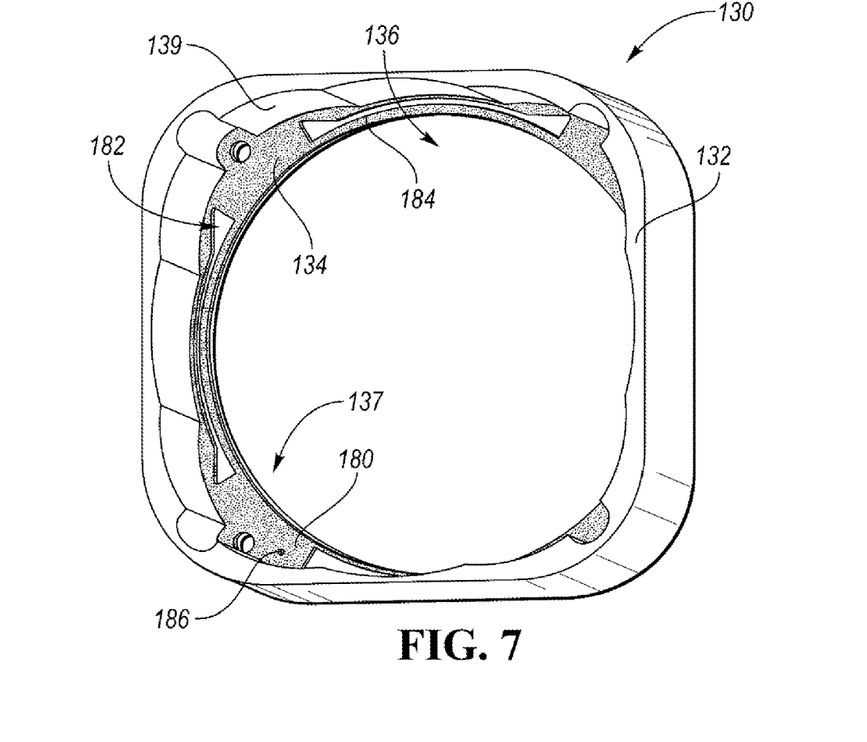
FIG. 7 is a perspective view of the housing.

Referring to FIGS. 3 and 7, the stator core 80 is received within a housing 130 having a sidewall 132 and an end wall 134 that cooperate to define a cavity 136 configured to receive the stator core 80. The cavity 136 has a shape that substantially matches the shape of the stator core 80. That is, the cavity 136 includes cutouts 139 for the mounting ears 108. In the illustrated embodiment, the housing 130 has an open end 152 and a closed end 137 formed by the end wall 134. The stator core 80 is received within the housing 130 through the open end 135.

Figure 5:
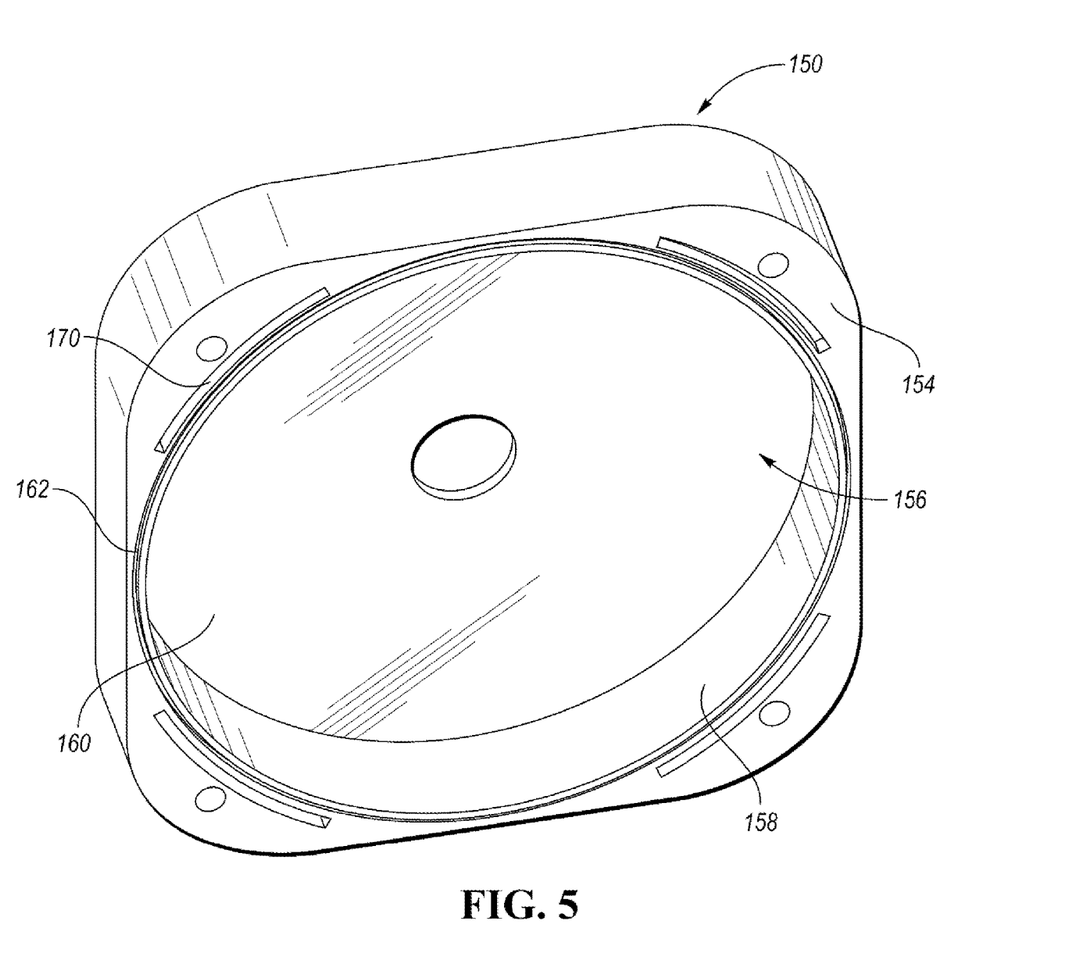
FIG. 5 is a perspective view of an end cover.
Figure 6:
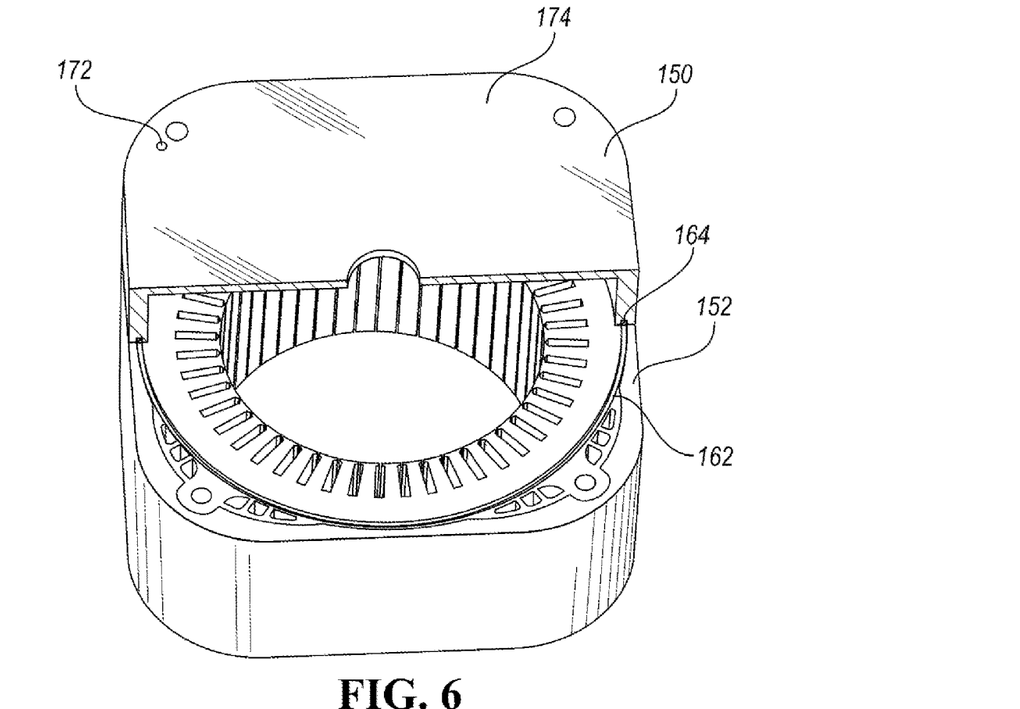
FIG. 6 is a perspective view of the end cover connected on the housing with a portion of the end cover removed for illustrative purposes.

Referring to FIGS. 5 and 6, the electric machine includes an end cover 150 that connects to the open end 152 of the housing 130. The end cover 150 includes a flat face 154 that is configured to engage with the stator core 80 and the opened end 152 of the housing. A cavity 156 is recessed into the flat face 154 to define a void space for the end windings that are received therein. The cavity 156 includes a circumferential wall 158 and a radially oriented wall 160, e.g., an end wall. The flat face 154 defines a circular seal groove 162 that surrounds a perimeter of the cavity 156. The seal groove 162 may have a diameter that substantially matches (within five percent) the outer diameter 82 of the stator core 80. This places the seal groove 162 radially inboard of the cooling channels 114. A circular seal 164 may be received within the seal groove 162 to provide a seal between the stator core 80 and the end cover 150. A second, outer seal (not shown) is disposed radially outboard of the core 80 near the periphery of the end cover 150 to seal the outer side of the cooling channels.

Radially outboard of the seal groove 162 are cooling channels 170. The cooling channels 170 are located in the vicinity of the mounting ears and are configured to connect the cooling channels 114 of each mounting ear in fluid communication. The cooling channels 170 may be shallow and arcuate slots recessed into the flat face 154. One of the cooling channels 170 may include a passage 172 extending from a bottom of the cooling channel 170 to the outer end 174 of the end cover 150. The passage 172 may be an oil supply or a drain depending upon the embodiment. In the illustrated embodiment, the passage 172 is an oil supply passage that connects with an oil circulation system associated with the electric machine.

Referring to FIG. 7, a gasket or other type of seal 180 is disposed against the end wall 134. The seal or gasket 180 defines void spaces 182 that are configured to form a cooling channel 184. The cooling channels 184 circulate coolant, e.g., oil, circumferentially to interconnect cooling channels 114 of adjacent mounting ears 108. For example, each cooling channel 184 may connect a first set of channels 116 of one mounting ear to an associated second set of channels 118 of another mounting ear. A passage 186 extends through the gasket 180 and the housing 130 to provide an oil supply or an oil drain. The passage 186 may be formed by a hole in the housing and another hole in the gasket 180.

Figure 8:
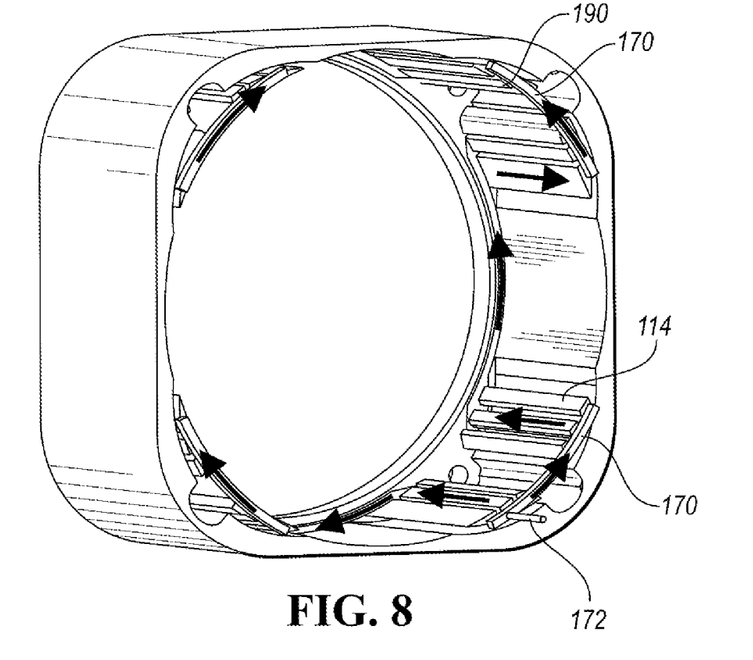
FIG. 8 is a perspective view of the housing with a negative of the cooling circuit shown therein.

FIG. 8 illustrates a representation of the cooling circuit 190 shown as a solid and disposed within the housing 130. The cooling circuit is configured to circulate coolant such as oil, transmission fluid, or other dielectric fluid. Generally, the cooling circuit 190 includes the axially extending cooling channels 114 that extend through the stator core 80, the circumferentially extending cooling channels 170 that are defined in the end cap, the other circumferentially extending cooling channels 184 that are on the opposite side of the stator core and are defined by the seal or gasket 180, and the passages 172 and 186. In the illustrated embodiment, fluid, e.g., oil, enters into the cooling circuit 190 via a supply passage 172. From there, coolant extends through one of the cooling passages 170 and down through the cooling passages 114 to the other side of the stator core 80. The coolant then circulates in opposite circumferential directions to the next set of cooling passages 116 and/or 118. This continues around and back and forth through the stator core 80 until the coolant exits the circuit 190 through the drain passage 186 (See FIG. 7). In an alternative embodiment, the passage 186 may be the supply and the passage 172 may be the drain.

Figure 9:
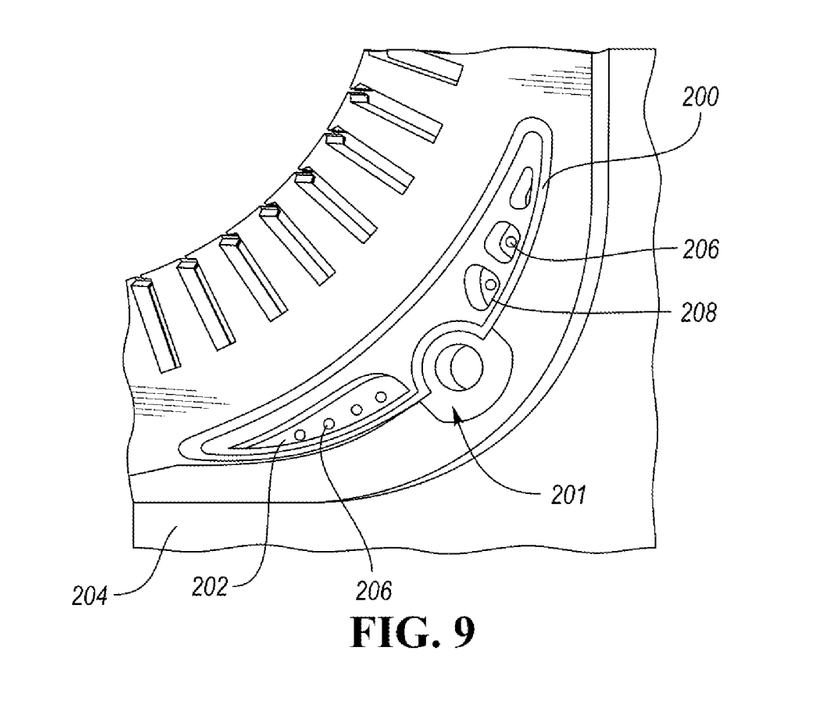
FIG. 9 is a partial perspective view of the stator core and housing with a seal according to an alternative embodiment.

FIG. 9 illustrates an alternative embodiment for sealing the cooling channels of the mounting ears. Here, a continuous seal 200 surrounds the perimeter of each mounting ear 201 to contain the coolant therein. The seal 200 may be a seal or gasket that is received within a groove defined in either the cover or the stator core. Alternatively, the seal 200 may be an applied gel or silicone. In one or more embodiments, the seal 200 is formed of RTV that is applied to the core as shown.

The example of FIG. 9 may also differ in that the end wall 202 of the housing 204 may define drain holes 206 that allow coolant within the cooling channels 208 two drain from the electric machine and into a sump of the transmission. In this embodiment, the coolant flows through the stator core in one direction only. That is, the coolant is supplied at one end of the stator, flows axially through the channels 208 and then drains via the drain holes 206.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle electric machine comprising:
   housing having a closed end and a cavity, wherein the closed end has an inside surface facing the cavity;
   a gasket disposed on the inside surface of the closed end and defining a first cooling passage extending circumferentially;
   a stator core including an inner diameter defining a plurality of slots, an outer diameter, and a plurality of mounting ears disposed radially outboard of the outer diameter, at least one of the mounting ears defining a cooling channel extending in an axial direction of the stator core and in fluid communication with the first cooling passage, wherein the gasket forms a seal between the stator core and the inside surface; and
   winding having portions disposed in the slots and end windings adjacent to an end face of the stator core.

2. The vehicle electric machine of claim 1 further comprising:
   an end cover connected to the housing and disposed over the end windings, wherein the end cover defines a circular seal groove disposed radially inboard of the cooling channel; and
   a seal disposed in the seal groove.

3. The vehicle electric machine of claim 2, wherein a diameter of the seal groove is substantially equal to the outer diameter of the stator core.

4. The vehicle electric machine of claim 3, wherein the end cover defines another cooling channel in fluid communication with the cooling channel of the stator core.

5. The vehicle electric machine of claim 2, wherein the end cover defines another cooling channel in fluid communication with the cooling channel of the stator core.

6. The vehicle electric machine of claim 1 further comprising seals, each associated with one of the mounting ears and encircling the cooling channel.

7. The vehicle electric machine of claim 1, wherein each of the mounting ears defines a plurality of cooling channels extending in the axial direction of the stator core.

8. The vehicle electric of claim 7 wherein, for each of the mounting ears, at least one of the cooling channels has a first flow direction and another of the cooling channels has a second flow direction that is opposite the first.

9. The vehicle electric machine of claim 7, wherein the closed end has an end wall that defines drain holes, each aligned with one of the cooling channels.

10. The vehicle electric machine of claim 9, wherein the drain holes extend through a thickness of the end wall.

11. A vehicle electric machine comprising:
    a housing having a closed end, an open end, and a cavity, wherein the closed end has an inside surface facing the cavity;
    a gasket disposed on the inside surface of the closed end and defining first cooling passages extending circumferentially;
    a stator core including an inner diameter defining a plurality of slots, an outer diameter, and a plurality of mounting ears each disposed radially outboard of the outer diameter and each defining at least one second cooling passage extending axially, wherein the stator core is received within the cavity with the second cooling passages in fluid communication with corresponding ones of the first cooling passages, wherein the gasket forms a seal between the stator core and the inside surface;
    windings disposed in the slots; and
    an end cover defining third cooling passages extending circumferentially and connected to the open end such that the second cooling passages are in fluid communication with corresponding ones of the third cooling passages.

12. The vehicle electric machine of claim 11, wherein the end cover defines a circular seal groove disposed radially inboard of the second cooling passages, and further comprising a seal disposed in the seal groove.

13. The vehicle electric machine of claim 11 further comprising a circular seal axially disposed between the stator core and the end cover and radially disposed inboard of the second cooling passages.

14. The vehicle electric machine of claim 13, wherein the circular seal has a diameter that is substantially equal to the outer diameter.

15. The vehicle electric machine of claim 13 further comprising a third seal disposed radially outboard of the second cooling channels.

16. The vehicle electric machine of claim 11, wherein at least one of the mounting ears includes a first set of the second cooling passages and a second set of the second cooling passages.

17. The vehicle electric machine of claim 16, wherein the first and second sets are configured to flow in opposite directions.

18. The vehicle electric machine of claim 16, wherein the first and second sets are configured to flow in a same direction, wherein the end wall defines drain holes aligned with the second cooling passages.

19. The vehicle electric machine of claim 11, wherein radial distances between a center of the stator core and inner-most portions of the second cooling passages are greater than a radial distance between the center and the outer diameter.

20. A vehicle electric machine comprising:
   a housing having a closed end, an open end, and a cavity, wherein the closed end has an inside surface facing the cavity;
   a gasket disposed on the inside surface of the closed end and defining a first cooling passage extending circumferentially;
   a stator core defining a second cooling passage extending axially, wherein the stator core is received within the cavity with the second cooling passage in fluid communication with the first cooling passage, wherein the gasket forms a seal between the stator core and the inside surface;
   windings disposed in the slots; and
   an end cover defining a third cooling passage extending circumferentially and connected to the open end such that the second cooling passage is in fluid communication with the third cooling passage.

* * * * *